(12) United States Patent
Brusson et al.

(10) Patent No.: US 8,283,415 B2
(45) Date of Patent: *Oct. 9, 2012

(54) POLYETHYLENE AND POLY(HYDROXYL CARBOXYLIC ACID) BLENDS

(75) Inventors: Jean-Michel Brusson, Montigny le Bretonneux (FR); Leen De Groof, Heverlee (BE)

(73) Assignee: Total Petrochemicals Research Feluy, Seneffe (Feluy) (BE)

( * ) Notice: Subject to any disclaimer, the term of this patent is extended or adjusted under 35 U.S.C. 154(b) by 154 days.

This patent is subject to a terminal disclaimer.

(21) Appl. No.: 12/674,551

(22) Filed: Feb. 22, 2010

(65) Prior Publication Data

US 2011/0166294 A1    Jul. 7, 2011

(30) Foreign Application Priority Data

Aug. 24, 2007  (EP) .................................... 07114921
Aug. 24, 2007  (EP) .................................... 07114924
Apr. 16, 2008  (EP) .................................... 08154640
Aug. 25, 2008  (WO) ................. PCT/EP2008/061097

(51) Int. Cl.
    *C08F 8/00*    (2006.01)
(52) U.S. Cl. .......................... 525/191; 525/411; 525/419
(58) Field of Classification Search .................. 525/191, 525/411, 419
    See application file for complete search history.

(56) References Cited

U.S. PATENT DOCUMENTS 7,947,754 B2 *   5/2011   Okuda et al. .................. 521/134
2009/0023861 A1 *   1/2009   Shimakage et al. ............ 525/89

* cited by examiner

*Primary Examiner* — Peter D Mulcahy

(57) ABSTRACT

A resin composition comprising at least 0.1% by weight of poly(hydroxy carboxylic acid) and at least 50% by weight of polyethylene prepared with a single-site catalyst, preferably a metallocene.

7 Claims, 4 Drawing Sheets

US 8,283,415 B2

POLYETHYLENE AND POLY(HYDROXYL CARBOXYLIC ACID) BLENDS

CROSS-REFERENCE TO RELATED APPLICATIONS

This application claims the benefit of PCT/EP2008/061097, filed Aug. 25, 2008, which claims priority from EP 07114924.9, filed Aug. 24, 2007, EP 07114921.5, filed Aug. 24, 2007 and EP 08154640.0, filed Apr. 16, 2008.

FIELD OF THE INVENTION

This invention is related to blends of poly(hydroxy carboxylic acid)s with polyethylene. In particular the invention is directed to blends of poly(lactic acid) with polyethylene prepared with single-site catalysts, preferably metallocene catalysts.

BACKGROUND OF THE INVENTION

In the past few years, the general public has become increasingly apprehensive of the impact man-made waste has on the environment. Hence there is a growing interest in developing novel biodegradable (and preferably compostable) plastics from renewable resources.

One particularly interesting candidate for this task is poly (hydroxy carboxylic acid), in particular poly(lactic acid) (PLA), now commercially available on a relatively large scale. The lactic acid is obtained from plants such as corn and sugar-cane or other sugar- or starch-producing plants. Not only is PLA obtainable from renewable materials, it is also industrially compostable. For these reasons, there is significant interest in using PLA as a substitute in applications, where petroleum-based thermoplastics have conventionally been used.

Unfortunately, PLA used on its own does not have the same advantageous properties as conventional plastics do. In particular PLA has performance problems related to heat resistance, brittleness and limited flexibility, resulting in poor mechanical strength. On the other hand, polyolefins, such as polyethylene, have much better mechanical properties. It has been attempted to combine these properties by blending PLA with polyethylene to obtain a resin that is at least partially obtainable from renewable resources, but still has acceptable mechanical properties. However, it is known that blending PLA with conventional polyethylenes such as Ziegler-Natta-catalysed polyethylenes provides heterogeneous resin blends, due to the differences in polarity and molecular weight distribution of the two components. In the past, compatibilising agents were used to increase the homogeneity of the blends. However, this requires an additional industrial step, as well as specific conditions during extrusion. Furthermore, the addition of compatibilising agents is expensive and changes the properties of the desired product. Thus both the compatibilising agent and the by-products change the properties of the desired end product, be it a film, fibre or moulded object.

EP 1 777 263 A also teaches mixing polyolefins with PLA by using a compatibiliser, wherein the compatibiliser is a hydrogenated, diene-based polymer containing at least one functional group selected from carboxyl group, acid anhydride group, epoxy group, (meth)acryl group, amino group, alkoxysilyl group, hydroxyl group, isocyanate group and oxazoline group. The polyolefin is a polymer obtained by polymerizing ethylene and/or at least one kind of alpha-olefin using either the high-pressure method or the low-pressure method. Examples of the alpha-olefin includes alpha-olefins of 3 to 12 carbon atoms, such as propylene, 1-butene, 1-pentene, 3-methyl-1-butene, 1-hexene, 3-methyl-1-pentene, 4-methyl-1-pentene, 3-ethyl-1-pentene, 1-octene, 1-decene, 1-undecene and the like.

US 2005/0192405 A discloses a polymer alloy of PLA and polyolefins. The two components are made miscible by including a polyalkylacrylic ester and/or a polyvinyl ester, as well as a block copolymer of a polyalkylacrylic ester and a polyolefin and/or a block copolymer of a polyvinyl ester and a polyolefin. The polyolefin described is either a polyethylene obtained by a radical polymerisation mechanism or a polyethylene or polypropylene obtained via cationic addition polymerisation mechanisms using Ziegler-Natta catalysts.

It is hence an object of the invention to develop a polyethylene-based resin that is at least partially obtainable from renewable resources and has better or at least similar mechanical properties than hitherto known blends of polyethylene with resins obtainable from renewable resources.

It is also an object of the invention to develop a resin that is at least partially obtainable from renewable resources and has improved mechanical properties in comparison with poly (hydroxy carboxylic acid)s.

Additionally, it is an object of the invention to develop a resin that is at least partially obtainable from renewable resources and has similar mechanical properties to polyethylene.

It is further an object of the invention to develop a resin that has better gas barrier properties than polyethylene.

It is also an object of the invention to develop a resin with better surface tension properties than polyethylene.

Furthermore, it is an object of the invention to blend polyethylene with poly(hydroxy carboxylic acid)s without having to use compatibilising agents to obtain homogeneous blends.

It is also an object of the invention to find a resin blend at least partially composed of materials from renewable resources that can be used in film, thermoforming, blow moulding, injection stretch blow moulding, extrusion blow moulding and/or rotational moulding applications.

At least one of the above objects is achieved with the implementation of the current invention.

SUMMARY OF THE INVENTION

The present invention solves at least one of the problems mentioned above by providing a resin composition comprising at least 0.1% and less than 50% by weight of poly(hydroxy carboxylic acid) and at least 50% by weight of polyethylene prepared with a single-site catalyst, in particular metallocene catalysts.

According to another embodiment, the resin composition comprises more than 50% by weight of polyethylene prepared with a single-site catalyst, in particular metallocene catalysts.

According to another embodiment, the resin composition essentially consists of poly(hydroxy carboxylic acid) and polyethylene prepared with a single-site catalyst, in particular metallocene catalysts.

The invention also covers the process for making the resin composition of the present invention.

Furthermore, the invention covers the use of poly(hydroxy carboxylic acids) to change the properties of polyethylene prepared with single-site catalysts, for example metallocene catalysts.

DETAILED DESCRIPTION OF THE INVENTION

Figure 1:
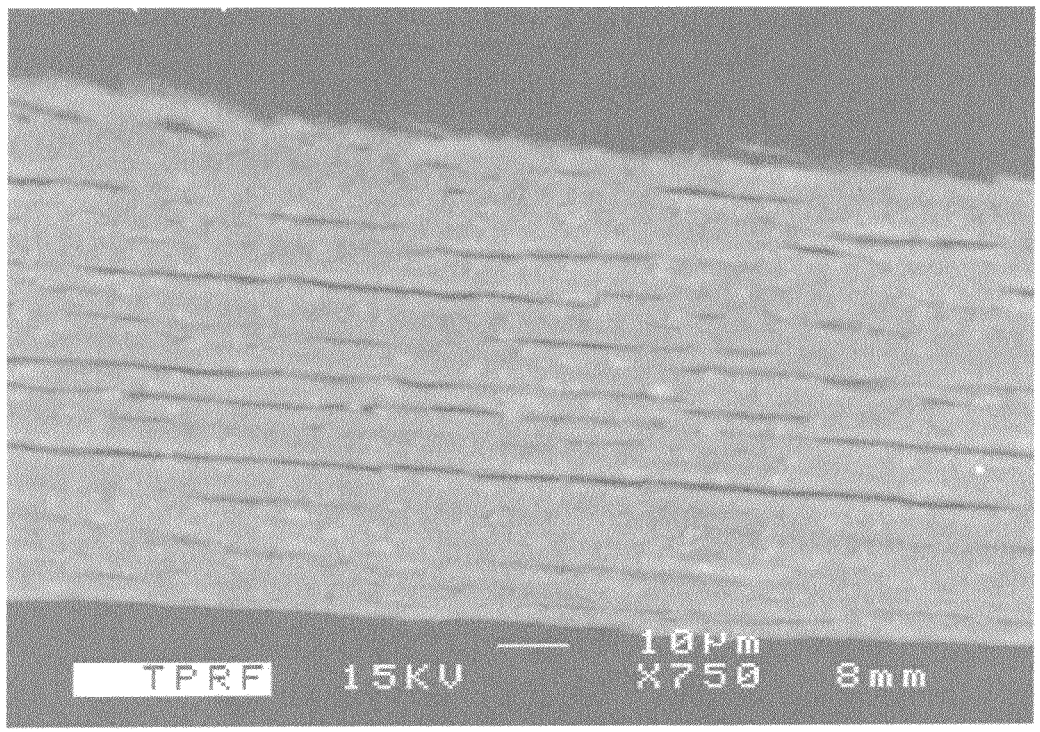
FIG. 1 shows scanning electron microscope (SEM) image of the microstructure of a film according to the invention comprising a metallocene-catalysed polyethylene and PLA.

As described above the present invention relates to a composition comprising a resin blend of poly(hydroxy carboxylic acid) and polyethylene prepared with a single-site catalyst, in particular metallocene catalysts.

Until now, it has been assumed that, it would be impossible to achieve homogeneous blends of poly(hydroxy carboxylic acid)s and polyethylene without using a compatibilising agent, especially in view of the differences in polarity. However, surprisingly this is not the case. In fact, the blends are sufficiently homogeneous and provide surprisingly acceptable properties, such that they can be used in compositions for films, thermoforming, injection blow moulding, extrusion blow moulding, injection stretch blow moulding, rotational blow moulding and the like, when polyethylene prepared with a single-site catalyst is used. It is thought that the more similar the molecular structure of the two components, the more miscible they become, despite differences in polarity.

The Poly(Hydroxy Carboxylic Acid)

The poly(hydroxy carboxylic acid) can be any polymer wherein the monomers are derived from renewable resources and comprise at least one hydroxyl group and at least one carboxyl group. The hydroxy carboxylic acid monomer is preferably obtained from renewable resources such as corn and sugar cane or other sugar- or starch-producing plants. Preferably the poly(hydroxy carboxylic acid) used in the invention is preferably obtained from renewable resources. The term "poly(hydroxy carboxylic acid)" includes homo- and co-polymers herein and blends of one or more of such polymers.

The poly(hydroxy carboxylic acid) can be represented as in Formula I:

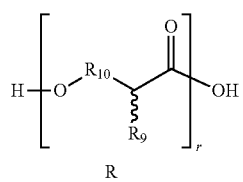

Formula I wherein
R9 is hydrogen or a branched or linear alkyl comprising from 1 to 12 carbon atoms;
R10 is optional and can be a branched, cyclic or linear alkylene chains comprising from 1 to 12 carbon atoms; and
"r" represents the number of repeating units of R and is any integer from 30 to 15000.

The monomeric repeating unit is not particularly limited, as long as it is aliphatic and has a hydroxyl residue and a carboxyl residue. Examples of possible monomers include lactic acid, glycolic acid, 3-hydroxybutyric acid, 4-hydroxybutyric acid, 4-hydroxyvaleric acid, 5-hydroxyvaleric acid and 6-hydroxycaproic acid to make for example polylactic acid), poly(glycolic acid), poly(3-hydroxybutyric acid), poly (4-hydroxybutyric acid), poly(4-hydroxyvaleric acid), poly (5-hydroxyvaleric acid) and poly(6-hydroxycaproic acid), respectively.

The monomeric repeating unit may also be derived from a cyclic monomer or cyclic dimer of the respective aliphatic hydroxycarboxylic acid. Examples of these include lactide, glycolide, β-propiolactone, β-butyrolactone, γ-butyrolactone, γ-valerolactone, δ-valerolactone, ε-caprolactone and the like.

In the case of asymmetric carbon atoms within the hydroxy carboxylic acid unit, each of the D-form and the L-form as well as mixtures of both may be used. Racemic mixtures can also be used.

The poly(hydroxy carboxylic acid) may optionally comprise one or more comonomer(s).

The comonomer can be a second different hydroxycarboxylic acid as defined above in Formula I. The weight percentage of each hydroxycarboxylic acid is not particularly limited.

The comonomer can also comprise dibasic carboxylic acids and dihydric alcohols. These react together to form aliphatic esters, oligoesters or polyesters as shown in Formula II, having a free hydroxyl end group and a free carboxylic acid end group, capable of reacting with hydroxy carboxylic acids, such as lactic acid and polymers thereof.

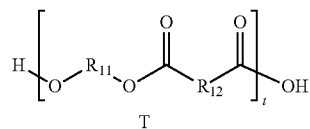

Formula II wherein
R11 and R12 are branched or linear alkylenes comprising from 1 to 12 carbon atoms and can be the same or different;
"t" represents the number of repeating units T and is any integer of at least 1

These copolymers are also within the scope of the invention. The sum of the number of repeating units "r" (Formula I) and "t" (Formula II) is any integer from 30 to 15000. The weight percentages of each monomer i.e. the hydroxycarboxylic acid monomer and the aliphatic ester, oligoester or polyester comonomer of Formula II are not particularly limited. Preferably, the poly(hydroxy carboxylic acid) comprises at least 50% by weight (wt %) of hydroxycarboxylic acid monomers and at most 50 wt % of aliphatic ester, oligoester or polyester comonomers.

The dihydric alcohols and the dibasic acids that can be used in the aliphatic polyester unit as shown in Formula II are not particularly limited. Examples of possible dihydric alcohols include ethylene glycol, diethylene glycol, triethyleneglycol, propylene glycol, dipropylene glycol, 1,3-butanediol, 1,4-butanediol, 3-methyl-1,5-pentanediol, 1,6-hexanediol, 1,7-octanediol, 1,9-nonanediol, neopentyl glycol, 1,4-cyclohexanediol, isosorbide and 1,4-cyclohexane dimethanol and mixtures thereof.

Aliphatic dibasic acids include succinic acid, oxalic acid, malonic acid, glutaric acid, adipic acid, pimelic acid, suberic acid, azelaic acid, sebacic acid; undecanoic diacid, dodecanic diacid and 3,3-dimethylpentanoic diacid, cyclic dicarboxylic acids such as cyclohexanedicarboxylic acid and mixtures thereof. The dibasic acid residue in the hydroxy carboxylic acid copolymer can also be derived from the equivalent diacylchlorides or diesters of the aliphatic dibasic acids.

In the case of asymmetric carbon atoms within the dihydric alcohol or the dibasic acid, the D-5, form and the L-form, as well as mixtures of both, may be used. This includes the possibility of using racemic mixtures.

The copolymer can be an alternating, periodic, random, statistical or block copolymer.

Polymerisation can be carried out according to any method known in the art for polymerising hydroxy carboxylic acids. Polymerisation of hydroxy carboxylic acids and their cyclic dimers is carried out by polycondensation or ring-opening polymerisation, respectively.

Copolymerisation of hydroxycarboxylic acids can be carried out according to any method known in the art. The hydroxycarboxylic acid can be polymerised separately prior to copolymerisation with the comonomer or both can be polymerised simultaneously.

In general, the poly(hydroxy carboxylic acid), homo- or copolymer (copolymerised with a second different hydroxy carboxylic acid or with an aliphatic ester or polyester as described above), may also comprise branching agents. These poly(hydroxy carboxylic acid)s can have a branched, star or three-dimensional network structure. The branching agent is not limited so long as it comprises at least three hydroxyl groups and/or at least three carboxyl groups. The branching agent can be added during polymerisation. Examples include polymers such as polysaccharides, in particular cellulose, starch, amylopectin, dextrin, dextran, glycogen, pectin, chitin, chitosan and derivates thereof. Other examples include aliphatic polyhydric alcohols such as glycerine, pentaerythritol, dipentaerythritol, trimethylolethane, trimethylolpropane, xylitol, inositol and the like. Yet another example of a branching agent is an aliphatic polybasic acid. Such acids include cyclohexanehexacarboxylic acid, butane-1,2,3,4-tetracarboxylic acid, 1,3,5-pentane-tricarboxylic acid, 1,1,2-ethanetricarboxylic acid and the like.

The total molecular weight of the poly(hydroxy carboxylic acid) depends on the desired mechanical and thermal properties of the final resin composition. It is preferably from 5,000 to 1,000,000 g/mol, more preferably from 10,000 to 500,000 g/mol and even more preferably from 35,000 to 200,000 g/mol. Most preferably the total molecular weight of the polymer is from 50,000 to 150,000 g/mol.

The molecular weight distribution is generally monomodal. However, in the case of mixtures of two or more fractions of poly(hydroxy carboxylic acid)s of different weight average molecular weight and/or of different type, the molecular weight distribution can also be multimodal e.g. bi- or trimodal.

From a standpoint of availability, transparency, the renewability and compostability, the poly(hydroxy carboxylic acid) is preferably a poly(lactic acid) (PLA). Preferably the poly(lactic acid) is a homopolymer obtained either directly from lactic acid or from lactide, preferably from lactide.

Thus, preferably the poly(hydroxy carboxylic acid) that is selected is biodegradable and more preferably compostable, for example PLA.

The Polyethylene

The polyethylenes used in this invention are prepared using single-site catalysts, preferably metallocene catalysts.

The term "polyethylene" herein includes homopolymers and copolymers having α-olefin comonomers. The term "polyethylene" herein also includes blends of two or more polyethylenes as defined below.

If the polyethylene is a copolymer, the comonomer can be any α-olefin i.e. any 1-alkylene comprising from 2 to 12 carbon atoms, for example, ethylene, propylene, 1-butene, and 1-hexene. The copolymer can be an alternating, periodic, random, statistical or block copolymer.

Preferably, the polyethylene used in the resin composition of the invention is a homopolymer or a copolymer of ethylene and butene or hexene.

The ethylene is polymerised at low-pressure in the presence of a single-site catalyst. Preferably, the catalyst is a metallocene catalyst. If required, more than one catalyst of the same or different type can be used, either simultaneously in one reactor, in two parallel reactors or in two reactors connected to each other in series, to obtain multimodal or broader molecular weight distributions.

Low-pressure polymerised polyethylene has low concentrations of long chain branching, giving it strong intermolecular forces and high tensile strength. Low-pressure polymerised ethylene can be broadly categorised as linear low density (LLDPE), medium density (MDPE) and high density (HDPE) polyethylene, the density being mainly regulated by the relative amount of comonomer added; the more comonomer added, the higher the degree of short chain branching and the lower the density. Preferably, the comonomer is propylene, 1-butene or 1-hexene. More preferably the comonomer is 1-butene or 1-hexene.

The overall properties of the polyethylene are dependent on the method and type of single-site catalyst used. A single-site catalyst is for example a metallocene catalyst or a constrained geometry catalyst. It has been found that poly(hydroxy carboxylic acid)s are more miscible with single-site catalysed polyethylene, in particular metallocene-catalysed polyethylene, than those blended with Ziegler-Natta or chromium catalysed polyethylene. Blends of single-site catalysed polyethylene, like metallocene-catalysed polyethylene, with poly(hydroxy carboxylic acid)s are homogeneous and do not require any compatibilisation. Suitable metallocene catalysts for ethylene polymerisation include, by way of example, ethylene bis(tetrahydroindenyl) zirconium dichloride, ethylene bis(indenyl) zirconium dichloride, bis(n-butylcyclopentadienyl) zirconium dichloride and mixtures thereof.

Compared to other polyethylenes, single-site catalysed polyethylene, in particular metallocene-catalysed polyethylene, has a much narrower molecular weight distribution. Preferably, the molecular weight distribution is at most 6, preferably at most 4, more preferably at most 3.5, most preferably at most 3. The narrow molecular weight distribution is compatible with the similarly narrow molecular weight distribution of poly(hydroxy carboxylic acid)s.

Without wishing to be bound by theory, it is thought that the molecular structure of single-site catalysed polyethylene, in particular metallocene-catalysed polyethylene, induces a better compatibility with poly(hydroxy carboxylic acid)s as well. The incorporation of comonomers, if present, occurs very regularly along the polyethylene backbone resulting in a highly uniform distribution of comonomers i.e. short chain branching is very regular. This effect (known as very narrow "short chain branching distributions" (SCBD)) in polyethylenes is specific to single-site catalysed polyethylenes, in particular metallocene-catalysed polyethylenes. As a result of the narrow SCBD, during crystallisation from the melt, very small crystallites are formed throughout the material, thus providing excellent optical clarity. Ziegler-Natta and chromium-catalysed polyethylenes on the other hand, have poor and very random comonomer incorporation. Therefore, during crystallisation a broad distribution of different sizes of crystallites is obtained, resulting in high haze values.

The Applicant believes, without wishing to be bound by theory, that since the molecular architecture of poly(hydroxy carboxylic acid)s is similar to that of single-site catalysed polyethylene (in particular metallocene-catalysed polyethylene), i.e. narrow molecular weight distribution, poly(hydroxy carboxylic acid)s are more compatible with single-site catalysed polyethylene, in particular metallocene-catalysed polyethylene, than with other polyethylenes.

Additionally, additives can be included in one or more components of the blend, they can be added during blending, and/or they can be included in a product formed from the blend, such as a film, as desired. Such additives are well known in the art, and can include, for example: antioxidants (e.g., hindered phenolics such as IRGANOX™ 1010 or IRGANOX™ 1076 available from Ciba™); phosphites (e.g. IRGAFOS™ 168 available from Ciba™); anti-cling additives; tackifiers, such as polybutenes, terpene resins, aliphatic and aromatic hydrocarbon resins, alkali metal and glycerol stearates and hydrogenated rosins; UV stabilizers; heat stabilizers; anti-blocking agents; release agents; anti-static agents; pigments; colorants; carbon black; dyes; waxes; silica; fillers; talc, anti-acid compounds; peroxides; grafting agents; lubricants; clarifying agents; nucleating agents and the like.

Blending of Poly(Hydroxy Carboxylic Acid) with Polyethylene

The blending of the poly(hydroxy carboxylic acid) with the polyethylene, prepared with a single-site catalyst, can be carried out according to any physical blending method and combinations thereof known in the art. This can be, for instance, dry blending, wet blending or melt blending. The blending conditions depend upon the blending technique and polyethylene involved. Depending on the method, the polyethylene and the poly(hydroxy carboxylic acid) can be in any appropriate form, for example, fluff, powder, granulate, pellet, solution, slurry, and/or emulsion.

If dry blending of the polymer is employed, the dry blending conditions may include temperatures from room temperature up to just under the melting temperature of the polymer. The components can be dry blended prior to a melt blending stage, which can take place for example in an extruder.

Melt processing is fast and simple and makes use of standard equipment of the thermoplastics industry. The components can be melt blended in a batch process such as in a Banbury, Haake or Brabender Internal Mixer or in a continuous process, such as in an extruder e.g. a single or twin screw extruder. During melt blending, the temperature at which the polymers are combined in the blender will generally be in the range between the highest melting point of the polymers employed and up to about 80° C. above such melting point, preferably between such melting point and up to 30° C. above it. The time required for the melt blending can vary broadly and depends on the method of blending employed. The time required is the time sufficient to thoroughly mix the components. Generally, the individual polymers are blended for a time of about 10 seconds up to about 10 minutes, preferably up to about 5 minutes, more preferably up to about 2 minutes.

The components can also be wet blended whereby at least one of the components is in solution or slurry form. If solution blending methods are employed, the blending temperature will generally be 25° C. to 50° C. above the cloud point of the solution involved. The solvent or diluent is then removed by evaporation to leave behind a homogeneous blend of poly(hydroxy carboxylic acid) and polyethylene.

According to an embodiment, the resin composition comprises at least 0.1% and less than 0.50% by weight of poly(hydroxy carboxylic acid) and at least 50% by weight of polyethylene, preferably more than 50% by weight of polyethylene.

More preferably, the resin composition comprises from 0.1 to 49.9 wt % of poly(hydroxy carboxylic acid), preferably from 0.1 to 30 wt %, more preferably from 0.1 to 20 wt %, even more preferably from 0.1 to 15 wt % and most preferably from 0.1 to 10 wt %. The resin composition comprises from 50 to 99.9 wt % of polyethylene, preferably from 70 to 99.9 wt %, more preferably from 80 to 99.9 wt %, even more preferably from 85 to 99.9 wt % and most preferably from 90 to 99.9 wt %.

Preferably, the resin composition essentially consists of polyethylene and poly(hydroxy carboxylic acid) i.e. at least 0.1 and less than 50 wt % of poly(hydroxy carboxylic acid) and 50 to 99.9 wt % of polyethylene.

In a preferred embodiment, according to the invention, the composition does not require compatibiliser for compatibilising polyethylene and poly(hydroxy carboxylic acid) i.e. it is free of such compatibilisation agents.

The resin composition according to the invention can also be used in blends with other resin compositions to be used in the same applications as mentioned in the following section.

The content of poly(hydroxy carboxylic acid) within the composition of the invention renders it partially compostable.

Compostability is herein defined as provided by the standard EN 13432:2000. In order for packaging material to be biodegradable it must have a lifecycle, which can be described as follows:

a period of storage and/or use starting from time $t_0$, which is the moment the material comes off the production line;

a period of disintegration starting at time $t_1$, during which the polymer begins to significantly chemically disintegrate e.g. via the hydrolysis of ester bonds;

a period of biodegradation, during which the partly hydrolysed polymer biologically degrades as a result of the action of bacteria and micro organisms;

It is important to make the distinction between degradable, biodegradable and compostable as often these terms are used interchangeably. In addition to the above, a compostable plastic is "capable of undergoing biological decomposition in a compost site as part of an available program, such that the plastic is not visually distinguishable and breaks down to carbon dioxide, water, inorganic compounds, and biomass, at a rate consistent with known compostable materials (e.g. cellulose) and leaves no toxic residue" (ASTM definition). On the other hand a degradable plastic is one which is merely chemically changed i.e. there is no requirement for the plastic to be biologically degraded by microorganisms. Therefore, a degradable plastic is not necessarily biodegradable and a biodegradable plastic is not necessarily compostable (that is, it breaks down too slowly and/or leaves toxic residue).

In particular, the EN 13432:2000 standard for compostability has the following main features:

Disintegration is measured by sieving the material to determine the biodegraded size. To be considered compostable, less than 10% of the material should be larger than 2 mm in size.

Biodegradability is determined by measuring the amount of carbon dioxide produced over a certain time period by the biodegrading plastic. To be considered compostable, it must be 90% biodegraded within 90 days.

Eco-toxicity is measured by determining whether the concentration of heavy metals is below the limits set by the standard and by testing plant growth by mixing the compost with soil in different concentrations and comparing it with controlled compost.

Applications of the Resin Composition

Due to the improved mechanical properties of the resin composition stemming from the presence of polyethylene, as well as the presence of material from renewable resources and compostability of the resin composition resulting from the presence of poly(hydroxy carboxylic acid), it is suitable for a wide variety of applications, including films and moulding applications, as described below.

The resin composition is particularly suitable for transformation into a film, for example cast, blown, uni-oriented and bi-oriented film. It has been surprisingly found that films formed from polymer blends of the invention exhibit improved properties, particularly higher tensile strengths relative to films of 100% polyethylene. Films comprising the resin composition of the invention have improved printability in comparison to films consisting only of polyethylene due to the higher surface tension of poly(hydroxy carboxylic acid)s, like PLA. The films according to the invention also have increased thermal and high frequency sealability in comparison to 100% polyethylene films. In particular, poly(hydroxycarboxylic acid) and metallocene-catalysed polyethylene blends have a sealing initiation temperature similar to metallocene-catalysed polyethylene alone (See FIG. 5). The presence of poly(hydroxy carboxylic acid)s also increases the stiffness of the film and provides enhanced water breathability in comparison to polyethylene films. The film also has improved barrier properties against atmospheric gases, in particular oxygen, carbon dioxide and nitrogen in comparison to films consisting solely of polyethylene.

The polymer blends of the invention can be used to form cast or blown films having a single layer (monolayer films) or multiple layers (multilayer films). When used in multilayer films, the polymer blends according to the invention can be used in any layer of the film, or in more than one layer of the film, as desired. When more than one layer of the film is formed using a polymer blend of the present invention, each such layer can be individually formulated, i.e. the layers formed can be the same or different in chemical composition, density, melt index, thickness and so on, depending upon the desired properties of the film. The other layer(s) can include resins made of 100% poly(hydroxy carboxylic acid), for example PLA, 100% polyethylene, for example, high-pressure polymerised low-density polyethylene (LDPE), LLDPE, MDPE or HDPE. Further, one skilled in the art will understand that the layers of a multilayer film must have the appropriate viscosity match.

The thickness of each layer of the film and of the overall film, are not particularly limited, but are determined according to the desired properties of the film. Typical film layers have a thickness of about 1 to 1000 μm, more typically about 5 to 100 μm, and typical films have an overall thickness of 5 to 200 μm, more typically 5 to 100 μm.

Preferably, the present invention provides a single-layer (monolayer) film formed using any of the polymer blends of the invention. According to another embodiment this film is 10 to 150 μm thick.

The films of the present invention may be formed by any number of well-known extrusion or coextrusion techniques. Any of the blown or chill roll techniques commonly used are suitable. For example, the composition can be extruded in a molten state through a flat die and then cooled to form a film. Alternatively, the composition can be extruded in a molten state through an annular die and then blown and cooled to form a tubular, blown film, which can then be axially slit and unfolded to form a flat film.

As a specific example, cast films can be prepared using a pilot scale commercial cast film line machine as follows. Pellets of the polymeric blend are melted at temperatures ranging from about 220° C. to about 270° C., with the specific melt temperature being chosen to match melt viscosities of the various resins. The flow is then extruded through a single manifold film extrusion die to the desired width. The die gap opening is typically within the range of 250 to 750 μm, preferably about 600 μm. The material is then drawn down to the final gauge. A vacuum box or air knife can be used to pin the melt exiting the die opening to a primary chill roll maintained at a temperature less than 35° C., preferably about 32° C.

As another example, blown films can be prepared as follows. The film can be for instance produced using a blown film line using a die with a die gap of 1.0-2.0 mm, preferably 1.2 mm, a die diameter of 1-100 mm, preferably 50 mm and a length to diameter ratio of 25. The blow-up ratio (BUR) can range from 1.0 to 10.0, preferably from 1.0 to 5.0, most preferably from 1.3 to 3.5. The film can then be extruded through the die into a film and cooled, for example by blowing air onto the surface of the film. In industrial processes, the film is then preferably drawn from the die to form a cylindrical film that is cooled, collapsed and optionally subjected to a desired auxiliary process, such as slitting, treating, sealing or printing. The finished film can be wound into rolls for later processing and converting.

Multiple-layer films may be formed by methods well known in the art. The materials forming each layer may be coextruded through a coextrusion feedblock and die assembly to yield a film with two or more layers adhered together but differing in composition. Coextrusion can be adapted to the cast film or the blown film processes. Multiple-layer films may also be formed by extrusion coating whereby a substrate material is contacted with the hot molten polymer as the polymer exits the die.

There are many potential applications for the films produced from the polymer blends described herein. These films can be made into other forms, such as tape, by any one of a number of well-known cutting, slitting, and/or rewinding techniques. They may be useful as stretch, sealing, or oriented films.

Surface tension of the film made from the blend is already improved in relation to polyethylene films. However, the surface tension of the films made with the resin composition of the invention can be increased even further by modifications known in the art, such as corona discharge, various chemical treatments, flame treatments and the like.

Films according to the invention can be used as cling films, stretch films, shrink films, bags, lamination films, liners, diaper films, candy wrappers or for a variety of other suitable end-use applications that will be apparent to those skilled in the art. The films can also be applied in packaging material, such as for bundling and unitizing a variety of products; flexible food packaging, including frozen food packaging; bags, such as trash bags and bin liners, industrial liners, shipping sacks and produce bags; and surface protection applications, with or without stretching, such as in the temporary protection of surfaces during manufacturing or transportation.

The composition is also suitable for typical injection, extrusion, extrusion blow moulding, stretch blow moulding and injection stretch blow moulding applications, but also thermoforming, foaming and rotational moulding applications. The articles made according to these processes can be mono- or multilayer, at least one of the layers comprising the resin composition of the invention.

The following are non-limiting examples illustrating the invention.

EXAMPLES

Two blends comprising 20% by weight of PLA Terramac® 6201 and 80% by weight of different polyethylenes were made by dry blending the two components, followed by extrusion at a temperature of 180° C. for about 30 minutes. Blend "A" was made with 80% by weight of metallocene-catalysed polyethylene (mPE) and blend "B" with 80% by weight of high-pressure polymerised LDPE.

The properties of the individual components are provided in Table 1.

TABLE 1

| | mPE | LDPE | PLA |
|---|---|---|---|
| Density/g/cm$^3$ | 0.923 | 0.924 | 1.26 at 23° C. |
| Melt index MI2/ g/10 min | 0.9 | 0.8 | 9-10 at 233 ppm H$_2$0 18-20 at 1000 ppm H$_2$0 |
| MW/Da | 88000 | 90000 | 106940 |
| MWD | 2.7 | 5.4 | 1.75 |
| CH$_3$/1000 C. | 9.6 | 23.7 | N/A |
| C$_4$H$_9$/1000 C. | 7.8 | N/A | N/A |
| Hexene comonomer/wt % | 4.7 | N/A | N/A |

N/A = not applicable

Densities of the polyethylenes and of the PLA were measured according to ASTM D 1505. Melt indices MI2 for polyethylene were measured according to ASTM D 1238, i.e. at 190° C. using a load of 2.16 kg, and according to the same standard for PLA, except the measurements were carried out once in the presence of 233 ppm water and once in the presence of 1000 ppm water.

MW and MWD for PLA and the polyethylenes were determined using GPC, where the PLA was dissolved in choloform and measurements were taken at 25° C.

Short chain branching indices of CH$_3$ and C$_4$H$_9$ of polyethylene were assessed using NMR.

Hexene comonomer weight percentage of the metallocene-catalysed polyethylene was determined using NMR.

A film was then prepared of each blend on a coex blown film extruder i.e. Collin blown film extruder at a throughput of 12 kg/h, using proportions 25%-50%-25%, with a length to diameter ratio of 25, a die diameter of 50 mm, a die gap of 1.2 mm and a blow-up ratio (BUR) of 1.3-3.5 to make films "A" and "B" according to the invention. According to the same procedure, films "C", "D" and "E" were made as a comparison, consisting only of mPE, LDPE and PLA, respectively. All films had a thickness of 100 µm. The properties measured for the films "A", "B", "C", "D" and "E" are provided in Table 2.

The coefficients of friction $\mu_s$ and $\mu_k$ were measured according to ASTM D 1494-02.

Elmendorf tear strength was measured in the machine direction (MD) and in the transverse direction (TD). These measurements were carried out according to ASTM D 1922

Dart impact strength (Dart) was measured according to ASTM D 1709.

Measurements for tensile strength at yield in the machine direction (MD) and in the transverse direction (TD) were carried out according to ASTM D 882-02.

Gloss was measured according to ASTM D 2457 at an angle of 45°.

Haze was measured according to ISO 14782.

TABLE 2

| | FILM A 80% mPE + 20% PLA | FILM B 80% LDPE + 20% PLA | FILM C 100% mPE | FILM D 100% LDPE | FILM E 100% PLA |
|---|---|---|---|---|---|
| Coefficient of friction | | | | | |
| Static ($\mu_s$) | 0.483 | 0.571 | 1.798 | 1.156 | 5.12 |
| Kinetic ($\mu_k$) | 0.459 | 0.537 | 1.480 | 1.454 | 2.69 |
| Mechanical properties | | | | | |
| Elmendorf MD/N/mm | 78.47 | 2.49 | 111.73 | 33.09 | 3.07 |
| Elmendorf TD/N/mm | 53.48 | 22.15 | 135.72 | 59.29 | 3.15 |
| Dart/g/µm | 2.51 | 0.15 | 7.17 | 2.59 | 0.63 |
| Tensile strength at yield MD/cN/tex | 19.57 | 14.51 | 11.78 | 11.33 | 73 |
| Tensile strength at yield TD/cN/tex | 16.23 | 10.83 | 11.93 | 11.40 | 59 |
| Optics | | | | | |
| Gloss | 23.4 | 14 | 78.9 | 71.5 | N/A |
| Haze/% | 66.5 | 73.7 | 7.5 | 7.6 | 0.8 |

Figure 2:
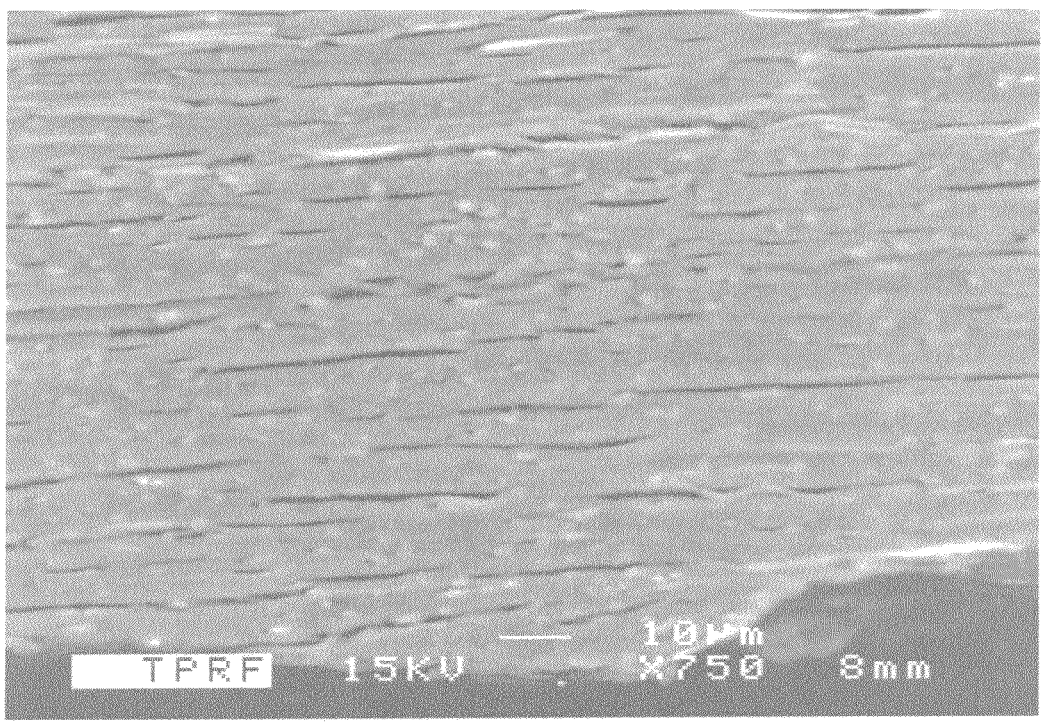
FIG. 2 shows an SEM image of the microstructure of a film comprising LDPE and PLA.
Figure 3:
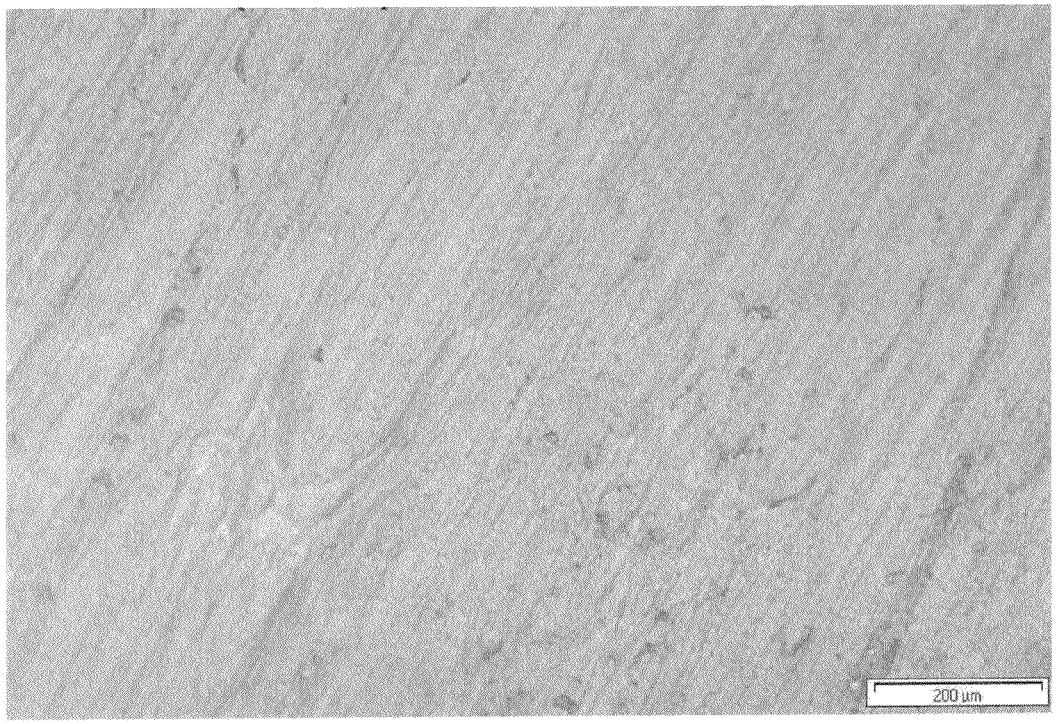
FIG. 3 shows an SEM image of the surface of a film comprising a metallocene-catalysed polyethylene and PLA.
Figure 4:
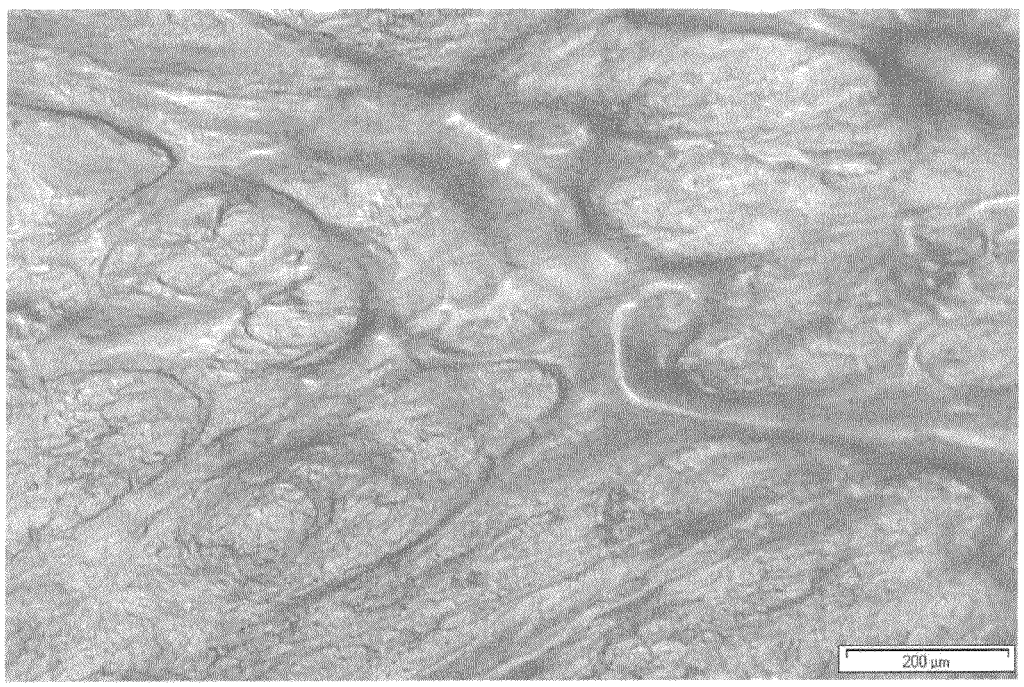
FIG. 4 shows an SEM image of the surface of a film comprising LDPE and PLA.

It can be seen that the blends of PLA and polyethylene are compatible, the metallocene-catalysed polyethylene being much more compatible with PLA than the high-pressure polymerised LDPE. FIGS. 1 to 4 show scanning electron microscope (SEM) images of the blends. FIGS. 1 and 2 are SEM images of the microstructure of films "A" and "B", respectively and FIGS. 3 and 4 are images of the surface of films "A" and "B", respectively. These figures show that films made of metallocene-catalysed polyethylene and PLA blends are more homogeneous than the LDPE-based equivalent. The difference is especially obvious when studying the SEM images of the surface structure of the films in FIGS. 3 and 4.

In table 2 it can be seen by blending PLA with a metallocene-catalysed polyethylene, mechanical properties than a film consisting only of PLA can be achieved. Furthermore, the Elmendorf tear strength in the machine directions of Film "A" is improved in comparison to Film "E". On the other hand Film "B" has an Elmendorf tear strength in the machine direction smaller than Film "E".

Film "A" also has similar properties to the 100% polyethylene films "C" and "D". Tensile strengths are improved and Elmendorf tear strengths and dart impact strength are comparable.

In relation to one another, blend "A" comprising the metallocene-catalysed polyethylene shows much higher mechanical strengths, in particular Elmendorf tear strengths in the machine direction, than blend "B" comprising the LDPE. Tensile strengths are even increased in comparison with the individual polyethylene resins. From Table 2 it can also be noted that polyethylenes can be used as a Dart impact strength modifier when blended with PLA.

In comparison with film "B", film "A" has a lower haze percentage value. This indicates further that the compatibility of mPE with PLA is much higher than the compatibility of LDPE with PLA.

Film "A" also has better gas barrier properties towards oxygen and carbon dioxide than film "B" as measured according to ASTM D 1434.

It has also proven easier to print on film "A" than to print on film "B" due to film "A"'s increased surface tension.

The advantages of using resin compositions of polyethylene films comprising PLA are manifold. First and foremost, a part of the resin composition is replaced with a rapidly renewable resource, PLA. The amount of ethylene derived from petroleum sources and required in the film can thus be diminished.

The presence of PLA in the resin composition also causes the final resin composition to be partially biodegradable and more importantly, compostable. Due to the more rapid compositing of PLA in the resin blend, the polyethylene that remains has a higher exposed surface area, so that this polyethylene will disintegrate faster than products made solely of polyethylene.

The invention claimed is:

1. A resin composition comprising at least 0.1% by weight of poly(hydroxy carboxylic acid) and at least 50% by weight of polyethylene prepared with a single-site catalyst.

2. The composition of claim 1, wherein the resin composition is free of compatibiliser for compatibilising polyethylene and poly(hydroxy carboxylic acid).

3. The composition of claim 1, wherein the polyethylene was prepared with an ethylene bis(tetrahydroindenyl) zirconium dichloride metallocene catalyst.

4. The composition of claim 1, wherein a molecular weight distribution of the polyethylene resin is at most 3.5.

5. The composition of claim 1, wherein the poly(hydroxy carboxylic acid) is poly(lactic acid).

6. The composition of claim 1, wherein the poly(lactic acid) is a copolymer and the comonomers are chosen from one or more of:
   aliphatic hydroxy carboxylic acids selected from glycolic acid, 3-hydroxybutyric acid, 4-hydroxybutyric acid, 4-hydroxyvaleric acid, 5-hydroxyvaleric acid, 6-hydroxycaproic acid and combinations thereof; and
   aliphatic polyesters of dihydric alcohols and dibasic carboxylic acids.

7. A process for preparing the resin composition of claim 1 comprising blending polyethylene prepared with a single-site catalyst and poly(hydroxy carboxylic acid) together.

\* \* \* \* \*